United States Patent [11] 3,607,236

[72] Inventors Parkman T. Brooks;
 Dale A. Martin, both of Salt Lake City, Utah
[21] Appl. No. 859,939
[22] Filed Sept. 22, 1969
[45] Patented Sept. 21, 1971
[73] Assignee The United States of America as represented by the Secretary of the Interior

[54] RECLAIMING OF SUPERALLOY SCRAP
 22 Claims, 1 Drawing Fig.
[52] U.S. Cl. ................................................ 75/101 R,
 75/101 BE, 75/112, 75/114, 75/119, 75/121,
 23/87 R, 23/15 W
[51] Int. Cl. ...................................................... C22b 7/00
[50] Field of Search ........................................ 75/119, 101
 R, 101 BE, 108, 121, 112, 114; 23/312, 312 ME,
 87, 15 W, 140, 50 BE

[56] References Cited
 UNITED STATES PATENTS
 972,149 10/1910 Baker ........................... 75/112
 2,202,525 5/1940 Hixson et al. ................. 23/23
 2,955,932 10/1960 Goren .......................... 75/121
 3,079,226 2/1963 Newkirk ....................... 23/312 X
 3,085,054 4/1963 Thornhill ..................... 75/119 X
 3,104,950 9/1963 Ellis ............................. 75/101 BE
 3,128,156 4/1964 Long et al. ................... 23/312
 3,193,381 7/1965 George et al. ............... 75/108
 3,224,874 12/1965 Daugherty .................... 75/108
 3,307,938 3/1967 Ronzio et al. ................ 75/103
 3,532,490 10/1970 Burkin .......................... 75/121 X Primary Examiner—Hyland Bizot
Assistant Examiner—G. T. Ozaki
Attorneys—Ernest S. Cohen and William S. Brown ABSTRACT: Valuable metals are recovered from superalloy scrap by a series of process steps comprising (1) dissolution of the scrap in chlorinated acidic aqueous solution, (2) removal of tungsten and silica by adsorption on activated carbon, (3) extraction of molybdenum with a water-immiscible organic phosphate or phosphonate, (4) extraction of iron with a water-immiscible secondary amine, (5) extraction of cobalt with a water-immiscible tertiary amine, (6) precipitation of chromium as a hydrous basic sulfate, and nickel recovery.

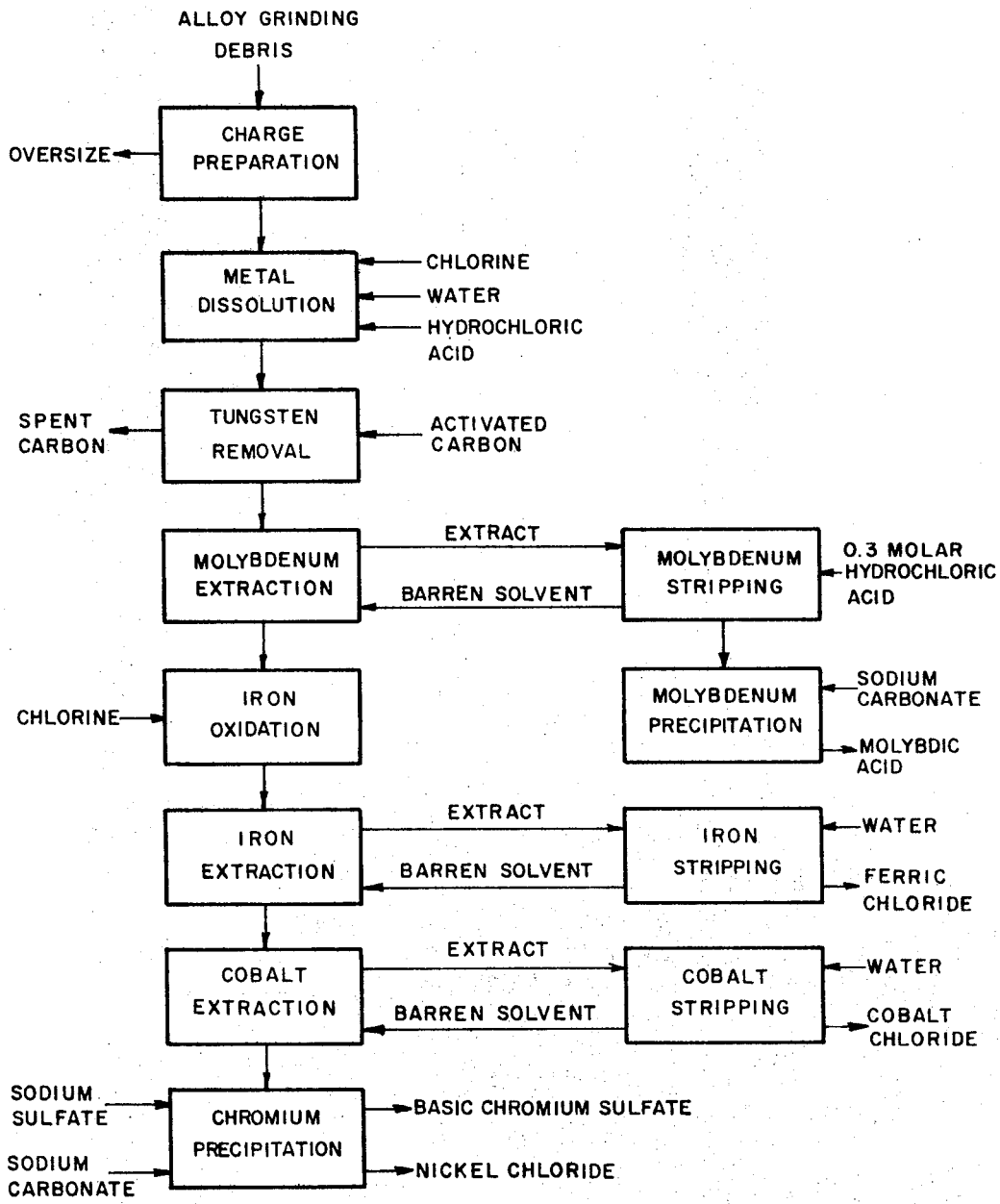

RECLAIMING OF SUPERALLOY SCRAP

Superalloys, which originally were developed for high temperature service in aircraft jet engines, are oxidation resistant and retain a high degree of strength at elevated temperatures. These alloys are richer in alloying constituents than the austenitic stainless steels and generally contain two-thirds cobalt or nickel with lesser amounts of other metals. Nickel and cobalt-based superalloys typically contain about 50 to 70 percent nickel and/or cobalt, 15 to 30 percent chromium, with the balance comprising molybdenum, tungsten, columbium, titanium, aluminum, iron manganese, silicon, and carbon. Nickel, cobalt, chromium and molybdenum comprise the greater part, and particularly the more valuable part, of waste produced during melting, casting and machining of the alloys. Much of this scrap is best utilized by remelting; however, when the scrap is contaminated, consists of turnings, borings, or grindings, or is of obsolete alloys, chemical processing is best utilized for conversion of the contained metals to marketable forms.

Chemical recovery methods are complicated because of the refractory nature of the superalloy scrap. Several processes resulting from U.S. Bureau of Mines research have been described, but none have been practical industrially. In addition, a chemical method for reclamation of corrosion resistant alloys is disclosed in U.S. Pat. NO. 2,715,588. This patent describes a method for metal dissolution and recovery of metals from simple alloys such as monel; however, no method is described for the separation of a molybdenum, tungsten, nickel, cobalt, iron and chromium from complex alloys.

Domestic recovery by chemical means has been done on a small scale chiefly to recover cobalt slats from simple cobalt alloy scrap. The more complex alloys are not treated because of the lack of economically attractive processes. Consequently, much scrap is marketed abroad for a fraction of its intrinsic value.

It has now been found that recovery of the above metals may be accomplished efficiently and economically from a chlorinated acid solution by the specific series of steps described below.

The figure is a flowsheet illustrating the series of steps that constitute the process of the invention.

PRELIMINARY TREATMENT

Contaminated scrap is cleaned to remove trash, cutting oils, nonmetallic grinding wheel debris, etc. Scrap wet with cutting oils is first roasted in a nonoxidizing atmosphere to remove moisture and to burn off oil and other organic matter. Screening is then used to remove coarse, e.g., about plus 0.25-inch, material, such as broken grinding wheels, that could prove troublesome, particularly in small-scale equipment. Grindings containing magnetic alloys are further treated in a dry, high-intensity magnetic separator to remove insoluble nonmagnetic grinding wheel debris that may compose from 10 to 30 percent of the mixture. As much as 80 percent of the grinding wheel debris is removed by this method but complete removal may not be successful because corundum particles are often tightly enmeshed by metallic shreds.

DISSOLUTION

Metal is dissolved from the charge by contacting with hot, acidic chloride solution saturated with chlorine gas. This is effectively done in practice with the charge contained in a false-bottomed vessel whereby leach solution is continuously withdrawn from the solution surface, saturated with chlorine in a packed column absorber, and pumped up through the grindings. When operated in a continuous manner, the charge is constantly fed to the dissolver as dissolution progresses with leach liquor being bled off and replaced with water or hydrochloric acid. The dissolution is most rapidly done at temperatures near boiling as the reaction becomes impractically slow at temperatures less than 80° C. Heat may be added by any suitable means, although much heat is generated by the chemical reaction of dissolution. It has been found that in some cases the heat of reaction is sufficient to provide the necessary temperature after the reaction has started.

Metal is taken into solution by at least two reactions shown in equations (1) and (2) using divalent metal (Me) as an example:

$$Me + 2HCL \rightarrow MeCl_2 + H_2 \quad (1)$$
$$Me + 2FeCl_3 \rightarrow MeCl_2 + 2FeCl_2 \quad (2)$$

Ferrous chloride formed in reaction (2) is reconverted to ferric chloride by chlorination in the absorber.

Dissolution rate generally increases with solution acidity. A minimum of a gram of hydrogen ion per liter of solution is usually necessary for rapid dissolution. However, it is preferred not to exceed 2 grams of hydrogen ion per liter in order to minimize acid neutralization costs in subsequent metal recovery steps.

Leach liquor is withdrawn from the system only when nearly saturated with metal chlorides because subsequent solvent extraction operations are most efficient using strong chloride solution. Product liquor generally contains about 150 to 350 grams, preferably about 250 grams, of chloride per liter.

ADSORPTION OF TUNGSTEN AND SILICA

Tungsten, both soluble and in suspension, as well as traces of silica and other suspended particles are removed by addition of activated carbon to the pregnant leach liquor, followed by agitation of the mixture and filtration. These impurities, unless removed beforehand, form sludges during solvent extraction that hinder phase disengagement and seriously interfere with equipment operation.

The type of activated carbon employed is not critical, provided it has adsorptive power sufficient to effectively remove tungsten and silica from the leach liquor. A particularly preferred type is that prepared from Lignite, having a particle size of about 100 mesh and surface area of about 700 m.$^2$/g.

Tungsten adsorption increases markedly with acidity ranging from 0.4 to 1.7 molar. Adsorption of molybdenum however, decreases with acidity. Further, tungsten is less soluble in more acidic solutions. Thus, increased acidity requires less carbon for tungsten removal because of better adsorption and decreased tungsten solubility. Lower carbon requirement is beneficial in reducing the loss of coadsorbed molybdenum. The acidity of the solution should therefore be at least 0.4 molar, preferably greater than 0.5 molar. THe amount of carbon used will vary with the source of the carbon, particle size, amount of tungsten in solution and acidity. HOwever, amounts of about 5 to 15 grams of carbon per liter of solution are generally satisfactory. Under these conditions, the carbon is highly selective for tungsten, with but little molybdenum being removed.

Contact time will usually be from about 20 to 60 minutes, with about 30 minutes usually being optimum. Longer contact time may result in solubilization of silica that interferes with subsequent solvent extractions. The adsorption is usually carried out at room temperature since little or no advantage is realized by the use of higher temperature.

EXTRACTION OF MOLYBDENUM

Molybdenum is removed from the acidic chloride leach liquor by means of a solvent extraction process. The extractant employed is a water-immiscible organic phosphate or phosphonate used in a water-immiscible organic diluent. Trioctylphosphate, $[C_4H_9CH(C_2H_5)CH_2O]_3$ P:O, and bis (2-ethylhexyl) 2-ethylhexyl phosphonate, $C_8H_{17}P(O)(OC_8H_{17})_2$, have been found to be very effective; however, other compounds of these types may be used in the invention. Examples are tributylphosphate and dibutylbutylphosphonate.

The primary purpose of the organic diluent is to reduce the viscosity of the organic phase to facilitate processing. It is generally relatively inert and may be chosen from any of the well-known groups of water-immiscible organic diluents or solvents such as ketones and aromatic and aliphatic hydrocarbons. kerosene is a preferred diluent.

For effective extraction of the molybdenum the type must contain 100, and preferably 200 or more, grams of chloride per liter. The optimum concentration will, of course, vary somewhat with the specific extractant employed as well as the composition of the feed, type of diluent, amount of extractant, etc. Chloride may be supplied by salts such as cobalt chloride, sodium chloride, nickel chloride, etc. A part of the chloride may also be derived from hydrochloric acid additions used to maintain optimum acidity in the solutions.

The aqueous feed must be acidic, with a hydrogen ion concentration of a gram per liter or more. This is necessary to hold molybdenum in solution. Also, extraction of molybdenum becomes impractically poor from solutions more basic that pH 1.0. Acid in excess of about 2 molar is, however, not desirable since the acid must be neutralized in subsequent operations and use of excess acid becomes unnecessarily expensive.

Aqueous feed potential measured using platinum and saturated calomel electrodes, also has a marked effect on molybdenum extraction. Molybdenum extraction is best at a solution EMF more negative than −350 mv. Extraction becomes impractically low near zero mv. Further, subsequent stripping of reduced forms of molybdenum extracted at EMF −350 mv. or more positive becomes difficult. Extraction of molybdenum from iron-containing solutions at EMF −500 mv., or more negative, is usually not desirable because coextraction of iron increases with EMF. Therefore, a solution EMF of about −450 mv. is preferred if coextraction of iron is to be minimized.

Optimum amounts of organophosphate or phosphonate and diluent are best determined by an economic appraisal of the process since the optimum amounts vary with composition of feed, number of extraction stages employed, and the particular extractant used. For example, best molybdenum extraction is obtained using bis (2-ethylhexyl) 2-ethylhexylphosphonate; however, this extractant extracts more iron than does trioctylphosphate. Further, trioctylphosphate is less susceptible to forming emulsions during solvent extraction. Generally, the organophosphates or phosphonates are used in concentrations near 0.5 molar with volume ratios of solvent to aqueous solution ranging from about 1:5 to 5:1.

The extraction, as well as subsequent stripping operations, may be effected by any of several well known techniques. These may be on a batch or continuous countercurrent basis, the latter usually giving best results.

Following extraction, molybdenum, as well as any coextracted iron, are stripped from the loaded organic phase with water or, preferably, dilute acid. This gives an aqueous solution of molybdenum and iron and a barren organic phase satisfactory for recirculating and reuse. Stripping is generally done with 0.3 molar hydrochloric acid because use of water results in precipitation of molybdic acid that forms troublesome emulsions in the stripping stages. Use of stronger acid should be avoided as the acid must be neutralized and excessive use would therefore be expensive.

Molybdic acid is precipitated by partly neutralizing the loaded strip solution, followed by heating. Addition of sodium carbonate, for example, to pH of nearly 1.0 is preferred. Use of less alkali results in poor recovery of the molybdenum, whereas a higher pH results in precipitation of iron that contaminates the molybdic acid. Heating the solution to boiling after adding the alkali increases the rate of molybdic acid precipitation and gives a more easily filterable product. Heating for about 1 hour is usually sufficient.

Following molybdenum extraction, the partly purified leach solution is treated in a suitable manner to oxidize contained iron to the ferric state as this is essential to the subsequent solvent extraction operation. Oxidation may be done in any of various well-known ways; however, saturation with chlorine is preferred because chloride ion enhances extraction of the iron. Chlorination to a solution EMF of at least −800 mv. is preferred to assure adequate conversion of ferrous iron to the ferric state.

EXTRACTION OF IRON

Ferric iron is readily removed by solvent extraction using certain water-immiscible secondary amines employed as a solution in a water-immiscible organic diluent. Zinc, not normally present in nickel or cobalt-based alloys but possibly present as a contaminant, is also extracted. Dodecenyltrialkylmethyl amines having molecular weights in the range of 350 to 400 have been found to be very effective; however, other water-immiscible secondary amines are nearly as effective and may be used in the invention. Molecular weights of these amines will generally vary from about 250 to 600. Other preferred amines are ditridecylamine and di-2-ethylhexylamine.

The purpose and characteristics of diluents for the amines are the same as for the organophosphates discussed above. An aromatic naphtha having a flash point of 115° F. is a preferred diluent.

For effective extraction of iron, as well as zinc, the aqueous feed must contain at least 100 and preferably 150 or more grams of chloride per liter supplied by salts such as nickel chloride, chromium chloride, etc. The pH of the aqueous feed may be as high as 4.5, but it is preferably 3 or less. This is necessary to maintain the amine in the form of hydrochloride, the active extractant. The acidic, high-chloride solution freed of molybdenum in the previous solvent extraction operation is suitable for iron extraction after the iron is oxidized.

Optimum amounts of amine and diluent are also best determined by an economic appraisal of the process since the optimum amounts vary with composition of feed, number of extraction stages employed, and desired composition of the strip solutions. For example, iron extraction from chloride solutions increases with amine concentration in the diluent and thereby diminishes the number of extraction stages required to reduce the iron concentration in the raffinate to a given level. However, use of a solvent containing a high concentration of amine may not be advantageous since water stripping of iron from such a solvent may require more stages to produce an iron-free organic phase than similar treatment of iron-bearing solvent containing a lower amine concentration. Generally, volume ratios of amine to diluent of about 1:20 to 1:2 and solvent to aqueous solution of about 1:5 to 5:1 are satisfactory.

Again, the extraction and subsequent stripping operations may be effected by any of several conventional techniques, with best results usually being obtained by employing countercurrent flow of solvent and feed.

Following extraction of iron and zinc, these metals may be stripped from the extractant by multistage countercurrent contact with water. This gives an aqueous solution of the metal chlorides and a barren organic phase for reuse.

EXTRACTION OF COBALT

Following iron extraction, the purified aqueous solution containing metals such as nickel, cobalt, and chromium is further treated to remove cobalt. This separation is readily accomplished by means of extraction of the cobalt with a tertiary amine hydrochloride as described in Bureau of Mines Report of INvestigations 6159. A preferred amine is triisooctylamine (TIOA). Maximum extraction is achieved using hydrochloric acid or nickel chloride solutions containing from 250 to 280 grams of chloride per liter of solution. HOwever, good extraction is usually achieved from solutions containing as little as 110 grams of chloride per liter. Good cobalt extraction may be achieved from solutions as mildly acidic as pH 3, above which hydrolysis of metal salts may occur.

A high flash point aromatic naphtha is preferred as diluent for TIOA as the higher solvency of aromatic naphtha diluents is necessary to prevent formation of a second organic phase.

Tests have shown that cobalt extraction varies as the square of amine concentration. Conversely, stripping becomes more difficult as the amine concentration increases. A half molar solution of TIOA in naphtha has proved to be a good compromise between extraction and stripping characteristics.

Stripping is easily effected with water which destroys the chlorocomplex, $(R_3NH)_2CoCl_4$, in which form the cobalt exists after extraction. The cobalt-bearing solution may then be treated by conventional means to produce cobalt chloride or other cobalt compounds.

PRECIPITATION OF CHROMIUM

Raffinate containing mainly nickel and chromium is then treated to separate these metals. It has been found that this may be achieved by precipitation of the chromium as a hydrous basic sulfate, leaving most of the nickel in solution substantially free of chromium.

A soluble sulfate is dissolved in the nickel and chromium-containing solution, preferably in an amount of about one part of sulfate ion per part of chromium. Sulfate ion in the chloride solution is beneficial in giving an easily filterable basic chromium sulfate precipitate. A sulfate satisfactory for this purpose will not interfere with the subsequent recovery of nickel, nor will it contaminate either the nickel or chromium products. Sodium sulfate is preferred, but other soluble sulfates such as potassium sulfate may be used.

Partial neutralization the acid and dilution are done simultaneously with the sulfate addition. A soluble alkali, or a solution of an alkaline agent, and water are added to the agitated solution to give a pH of about 2.2 to 2.8, preferably about 2.5, and a chromium concentration of about 20 grams per liter or less. A satisfactory alkaline agent will not contaminate the products, nor will it react with the sulfate ion. Sodium carbonate is preferred. Another suitable alkaline agent is sodium hydroxide. Diluting the chromium concentration to about 20 grams per liter is necessary to prevent gelation and improve the filtering characteristics of the chromium precipitate produced in the following operation. Chromium concentration of less than 20 grams per liter is not detrimental.

Aging the solution at this point improves the filtration characteristics of the chromium precipitate in the next operation. Aging for about 16 hours is adequate but prolonged aging is not detrimental.

The aged is then cooled to about 10° C. and a predetermined quantity of alkaline solution is added with vigorous agitation. The quantity of alkali must be carefully fully determined as an excess will precipitate nickel as well as chromium and insufficient alkali will fail to precipitate all of the chromium. The requisite amount of alkali is best determined by the known technique of titrating a sample to the chromium equivalence point. Preferably, a saturated solution of sodium carbonate is used, with a final pH of about 3.4 being reached. The above-listed alkaline agents may also be used. Cooling the solution prior to the final neutralization is essential to effect a good separation of chromium from nickel. Cooling to 10° C. allows addition of alkali without immediate precipitation of either chromium or nickel. Cooling to less than 10° C. gives only slightly improved results.

Precipitation of chromium is then accomplished by rapidly heating the solution to boiling to effect the hydrolysis reaction. The precipitate is filtered, water washed, and the washings combined with the filtrate for subsequent nickel recovery. The chromium-bearing precipitate may be further treated for recovery of chromium by any of various known techniques.

Nickel may be recovered from the filtrate and washings by any of several known techniques; for example, by precipitation as a hydroxide or carbonate with alkali followed by calcination to give nickel oxide for steelmaking.

The invention will be more specifically illustrated by the following example, with reference to the figure.

EXAMPLE

Referring to the flowsheet of the figure, debris from dry grinding alloy billets was screened to remove oversize material, chiefly pieces of grinding wheel, that would plug the equipment. The grindings were fed continuously into the dissolver described previously, and the metallic components were dissolved by the boiling, chlorinated leach liquor containing 1.2 to 1.8 grams of hydrogen ion per liter. Solution was bled from the dissolver at a specific gravity of 1.35 and an EMF of −450 mv. Water and hydrochloric acid were added to make up for the volume of solution bled off and to maintain the desired acidity. Operation in this manner dissolved, in percent by weight of the metal charged, 99.6 Ni, 90 Mo, 99.5 Co, 91 Cr, 97 Fe, and 10 W. Much of the tungsten was suspended in the leach solution as insoluble tungstic acid. Material not dissolved was mainly abrasive materials and metallic carbides. The leach liquor assayed, typically, in grams per liter, 105 Ni, 36 Cr, 28 Fe, 11 Mo, 13 Co, 1.3 W, 310 Cl, and 1.3 $H^+$.

Tungsten and traces of silica were removed from the leach liquor by agitation for 30 minutes at room temperature with 5 grams of activated carbon per liter. Filtration gave a spent carbon cake containing 21 percent by weight tungsten and a filtrate in which the remaining tungsten was 0.01 gram per liter.

Continuous countercurrent solvent extraction of molybdenum was done next in seven actual extraction stages using 0.5 molar trioctylphosphate in kerosene at a solvent-to-feed ratio of 0.65 by volume. Stripping the extract phase was done in four stages using 0.3 molar HCl at an organic-to-aqueous phase ratio of 4.9 by volume. Molybdenum remaining in the raffinate was 0.01 gram per liter and the molybdenum-rich strip liquor contained, in grams per liter, 92 Mo, 15 Fe, 110 Cl, and 3.3 $H^+$. The barren organic phase was continuously recycled.

Molybdic acid was precipitated from the strip solution by adjusting the acidity to pH 0.5 with sodium carbonate followed by heating to boiling. Better than 99 percent of the molybdenum was precipitated to give a product that, when dried at 105° C., contained 60 percent by weight Mo and 2 percent by weight Fe.

Molybdenum-free leach liquor was next chlorinated to a solution EMF of −900 mv. to oxidize the iron to the ferric state. Iron was extracted on a continuous countercurrent basis using 0.25 molar dodecenyl-trialkyl-methyl amine hydrochloride dissolved in aromatic naphtha. Five actual extraction stages were employed at an organic-to-aqueous phase ratio of 2.2 by volume. The extract phase was stripped of iron with water in four stages at an organic-to-aqueous phase ratio of by of volume. Iron remaining in the solvent extraction raffinate was less than 0.02 gram per liter, and the iron-rich strip liquor contained typically, in grams per liter, 39 Fe, 0.18 Co, 0.04 Ni, 0.04 Cr, 88 Cl, and 0.6 $H^+$. The barren organic phase was recycled.

The iron-free leach liquor was next extracted in a continuous countercurrent manner to remove cobalt using 0.5 molar triisooctylamine hydrochloride dissolved in an aromatic naphtha. A solvent-to-feed phase ratio of 1.33 by volume was used in seven actual extraction stages, and cobalt was stripped with water from the extract in five stages at an organic-to-aqueous phase ratio of 4.4 by volume. Cobalt remaining in the solvent extraction raffinate was 0.02 gram per liter, 40 Co, 0.3 Ni, 57 Cl, and 0.2 $H^+$. The barren organic phase was recycled.

The final solvent extraction raffinate containing mainly chromium and nickel chlorides was next treated batchwise to separate the chromium from the nickel. The solution was diluted to 25 grams of chromium per liter, 37.5 grams of sodium sulfate per liter were dissolved, sodium carbonate was added to a pH of 2.5, and the solution was aged overnight. The aged solution was vigorously agitated and cooled with ice to 8° C. and the necessary saturated sodium carbonate, determined by titrating a sample with sodium carbonate, was added. The solution was heated to 95° C. for 30 minutes and the precipitated basic chromium sulfate was filtered, water washed, and dried at 105° C. The precipitate assayed, typically, in percent by weight 31 Cr, 3.4 Ni, and 5.1 S.

Nickel contained in the filtrate and washings from chromium precipitation was next precipitated as a basic carbonate by adding sodium carbonate solution to pH 8. The precipitate was filtered, water washed, and calcined to give nickel oxide assaying, in percent by weight, 69 Ni, 0.025 Cr, 0.05 S, <0.001 P, and 0.02 Co.

What is claimed is:

1. A process for recovery of tungsten, molybdenum, iron, cobalt, chromium and nickel values from alloy scrap comprising the steps of (1) dissolution of the scrap in a gaseous chlorine-treated acidic aqueous solution, (2) removal of tungsten and silica by adsorption on activated carbon, (3) extraction of molybdenum with a water-immiscible organic phosphate or phosphonate, (4) extraction of iron with a water-immiscible secondary amine, (5) extraction of cobalt with a water-immiscible tertiary amine, (6) precipitation of chromium as a hydrous basic sulfate by simultaneous addition of sodium or potassium sulfate in an amount of about one part of sulfate ion per part of chromium, of sodium carbonate or hydroxide in an amount to give a pH of about 2.2 to 2.8 and of water in an amount to provide a concentration of chromium of about 20 grams per liter, and (7) recovery of nickel from the residual aqueous solution.

2. The process of claim 1 in which the molybdenum is extracted with a solution of the phosphate or phosphonate in a water-immiscible organic diluent.

3. The process of claim 2 in which the extractant is trioctylphosphate.

4. The process of claim 2 in which the extractant is bis (2-ethylhexyl) 2-ethylhexylphosphonate.

5. The process of claim 2 in which the diluent is Kerosene.

6. The process of claim 2 in which the feed solution contains at least 150 grams of chloride per liter.

7. The process of claim 2 in which the pH of the feed solution is not greater than 1.0.

8. The process of claim 2 in which the EMF of the feed solution is more negative than −350 mv.

9. The process of claim 1 in which iron in the feed solution is oxidized prior to extraction.

10. The process of claim 9 in which oxidation is effected by saturation with chlorine.

11. The process of claim 1 in which the iron is extracted with a solution of the amine in a water-immiscible organic diluent.

12. The process of claim 11 in which the extractant is a dodecenyltrialkylmethyl amine having a molecular weight in the range of about 350 to 400.

13. The process of claim 11 in which the diluent is an aromatic naphtha.

14. The process of claim 11 in which the feed solution contains at least 100 grams of chloride per liter.

15. The process of claim 11 in which the pH of the feed solution is 3 or less.

16. The process of claim 1 in which the precipitation of chromium comprises the steps of (1) addition of a soluble sulfate, an alkali and water, (2) aging the resulting solution, (3) cooling the aged solution and further addition of alkaline solution, and (4) heating the solution to boiling.

17. The process of claim 16 in which the soluble sulfate is added in step (1) in amount of about one part of sulfate ion per part of chromium, alkali is added in step (1) in an amount to give a pH of about 2.5 and water is added in step (1) in an amount to give a chromium concentration of about 20 grams per liter.

18. The process of claim 16 in which the soluble sulfate is sodium sulfate.

19. The process of claim 16 in which the alkali is sodium carbonate.

20. The process of claim 16 in which the aging of step (1) is for a period of about 16 hours.

21. The process of claim 16 in which the aged solution is cooled to about 10° C. in step (3).

22. The process of claim 16 in which the addition of alkaline solution in step (3) is in an amount to lower the pH to about 3.4.